(12) United States Patent
Kantola

(10) Patent No.: US 7,127,265 B2
(45) Date of Patent: Oct. 24, 2006

(54) SYSTEM FOR TRANSMITTING INFORMATION IN A DIGITAL RADIO NETWORK SYSTEM

(75) Inventor: Marko Kantola, Jyväskylä (FI)

(73) Assignee: EADS Secure Networks Oy, Helsinki (FI)

( * ) Notice: Subject to any disclaimer, the term of this patent is extended or adjusted under 35 U.S.C. 154(b) by 353 days.

(21) Appl. No.: 10/496,745

(22) PCT Filed: Dec. 3, 2002

(86) PCT No.: PCT/FI02/00971
§ 371 (c)(1),
(2), (4) Date: May 26, 2004

(87) PCT Pub. No.: WO03/049372
PCT Pub. Date: Jun. 12, 2003

(65) Prior Publication Data
US 2005/0020294 A1    Jan. 27, 2005

(30) Foreign Application Priority Data
Dec. 7, 2001    (FI) .................................. 20012415

(51) Int. Cl.
*H04B 7/00* (2006.01)
*H04Q 7/20* (2006.01)
(52) U.S. Cl. .................... 455/518; 455/508; 455/552.1
(58) Field of Classification Search ................ 455/507, 455/508, 517, 518, 519, 520, 552.1; 370/327, 370/340
See application file for complete search history.

(56) References Cited

U.S. PATENT DOCUMENTS 5,960,360 A    9/1999    Carmon et al. ............. 455/518

6,163,680 A    12/2000    Bridle et al. ................ 455/31.2
2004/0102204 A1*    5/2004    Bar-On ........................ 455/517

FOREIGN PATENT DOCUMENTS

| EP | 1220519 A1 | 7/2002 |
| GB | 2286505 A * | 8/1995 |
| GB | 2316271 A | 8/1996 |
| WO | WO-01/37497 A1 | 5/2001 |

* cited by examiner

*Primary Examiner*—Nay Maung
*Assistant Examiner*—Dominic E. Rego
(74) *Attorney, Agent, or Firm*—Harrington & Smith, LLP

(57) ABSTRACT

The invention concerns a system for transmitting information in a digital radio network system (12) between at least two modes of operation, which may be—a direct mode operation (DMO) between two terminal devices (10.1, 10.2) operating independently of the physical radio network system (21) and—a trunked mode operation (TMO) supporting distribution of network resources and operating in the physical radio network system (21). The transmission takes place with the aid of a special gateway unit (22), wherein the gateway unit (22)—listens to each or to a chosen mode of operation (DMO, TMO),—receives the transmission occurring in one mode of operation (TMO, DMO), and—transmits the received transmission to the other mode of operation (DMO, TMO). The gateway unit (22) is formed of two terminal devices (12.1, 12.2) supporting each mode of operation, and whose data transfer interface (**23.3\*, 23.3') have an audio input (AUDIO In) and output (AUDIO Out) as well as a receiving indication output (RX On) and a transmission connection input (PTT). The terminal devices' (12.1, 12.2) receiving indication output (RX On) is connected to the other terminal device's (12.2, 12.1) transmission connection input SIT), and wherein the terminal devices' (12.1, 12.2) audio output (AUDIO Out) is connected to the other terminal device's (12.2, 12.1**) audio input (AUDIO In).

8 Claims, 2 Drawing Sheets

SYSTEM FOR TRANSMITTING INFORMATION IN A DIGITAL RADIO NETWORK SYSTEM

FIELD OF THE INVENTION

The invention concerns a system for transmitting information in a digital radio network system between at least two modes of operation, which may be
- a direct mode operation (DMO) between two terminal devices operating independently of the physical radio network system, and
- a trunked mode operation (TMO) supporting distribution of network resources and operating in the physical radio network system and wherein the transmission takes place with the aid of a special gateway unit, wherein the gateway unit
- listens to each or a chosen mode of operation (DMO, TMO),
- receives the transmission occurring in one mode of operation (TMO, DMO), and
- transmits the received transmission to the other mode of operation (DMO, TMO).

BACKGROUND OF THE INVENTION

Different modes of operation of terminal devices are known from the radio telephone network according to the TETRA (TErrestrial Trunked Radio) standard. Modes of operation are e.g. the so-called direct mode operation, that is, the terminal device's DMO (Direct Mode Operation) function, which means direct communication taking place between terminal devices independently of the TETRA network proper. The DMO function is utilised especially e.g. in peripheral areas of the coverage area of the TETRA network or outside this, where the network's field strength is weak or the network is not at all available. The DMO function may also be used within the coverage area of the network, if the group of users wishes e.g. to communicate only internally and does not wish that its communication is audible to all others communicating in the network.

Furthermore, in the TETRA network a so-called mode of operation supporting distribution of network resources, that is, the terminal device's TMO (Trunked Mode Operation) function, is available in the coverage area of the physical network formed by base transceiver stations (generally at least in densely populated areas). Use of this function is possible for all users of terminal devices located within the coverage area of the TETRA network. Besides transmission of voice messages, it is possible in the TMO function e.g. to form groups of users, whereby messages may be allocated to the relevant group. In addition, in the physical TETRA network transmission of so-called status and SDS (Short Data Service) messages is possible as well as transmission of group settings, for example, by units forming a group or by a dispatcher, who usually is an operation leader on duty at a piece of fixed terminal device. Such messages include e.g. short messages and alarms, and settings include forming and management of groups performed by an operator over the air.

However, problems in smooth communications are caused by e.g. the edges of the TETRA network's audibility coverage area and by the areas remaining outside the coverage area. Maintaining communication ability between units would be priceless, for example, in remote areas, where the actual physical TETRA network is not available due to its limited coverage area and where a group using the DMO function would nevertheless have a significant need to communicate, for example, with an operation leader working at a fixed terminal or with a mobile operation leader.

Examples of typical situations where functionality of the described kind in message transmission would often be needed are various kinds of rescue duties to be performed outside the TETRA network's coverage area, and in densely populated areas e.g. operations to be performed in basements and in parking halls of buildings made of concrete, where problems may occur with the covering ability of the actual physical TETRA network. Even within the coverage area of the actual physical TETRA network such situations may occur, when e.g. the operation leader would need to communicate from his terminal device with a group, which has chosen the DMO function and which is "isolated" in terms of communication. Furthermore, message transmission between groups operating in the same mode of operation within the TETRA network's coverage area is difficult, which is due, for example, to the different access permissions granted to the units, because it must in most cases be handled at the operational centre through the person on duty.

Some such gateway solutions of the TETRA network are known previously, where e.g. a special gateway device is arranged in a vehicle. Using this device it is possible e.g. from outside the coverage area of the actual physical TETRA network to transmit communication of all terminal devices using the DMO function to terminal devices located within the coverage area of the actual TETRA network. However, the implementation of the device is quite complicated, disadvantageous and specific. In addition, a device of the described kind transmits not only communication in speech form, but in practice also all the data to be transferred in the TETRA network, that is, e.g. the status messages of groups etc. For example, in the situations described above it would be sufficient to transmit communication only in speech form between units, for example, from groups using the DMO function of their terminal devices to a group located in the coverage area of the actual TETRA network and using the terminal device's TMO function, and vice versa.

WO publication 96/11554 presents a TMO-DMO relaying station using two receiver units and one transmitter unit as well as a special management unit to control these. The first receiver unit receives radio messages from a base transceiver station and the second receiver unit receives radio messages from terminal devices transmitting as a DMO function. However, such use of two receiver units makes the solution complex and disadvantageous.

Other solutions known from the analog technology side are various solutions of the gateway type. WO publication 94/28641 presents a relaying station suitable e.g. for an analog mobile telephone system (e.g. NMT). Here the connection from the receiving side to the transmitting side is in the audio frequency mode. The solution is purely of the repeater type, which cannot thus be used for relaying communication e.g. between terminal devices operating in different modes of operation.

In view of the known technology there are no advantageous and simple ways in a radio network system according to the TETRA standard e.g. of implementing communication in the described kind between the TETRA direct mode operation DMO and the TMO mode of operation supporting distribution of network resources.

SUMMARY OF THE INVENTION

It is a purpose of the present invention to bring about an essentially simpler and more advantageous system for transmission of information between terminal devices operating in the same modes of operation and in different modes of operation in a digital radio network system. The characteristic features of the system according to the invention are presented in claim 1.

The system according to the invention is implemented with a gateway unit based on two pieces of terminal device known as such and supporting both modes of operation and having matching data transmission interfaces in order to transmit at least simple messages (for example, in audio form) on the half-duplex and/or the duplex principle. Hereby the data transmission interfaces must include at least a receiving indication output and a transmission connection input as well as an output and an input in audio form. According to an advantageous embodiment, the system according to the invention allows linking of communication in different modes of operation to each other in such a way that the communication to take place between terminal devices using the DMO function is audible also in the coverage area of the actual physical TETRA network in terminal devices, which have chosen the TMO function, and vice versa.

According to a more advanced embodiment, it is possible besides speech messages between modes of operation also to transmit data information to be transferred in groups of modes of operation, such as e.g. short messages, status messages, situation indications and other such data characteristic of the TETRA network. Hereby the gateway unit includes e.g. an RS data bus of series form for relaying traffic of groups of modes of operation.

Furthermore, the system according to the invention allows varying of its use for several different modes of linking. It can be used to link not only groups choosing different modes of operation, but also groups working in the same mode of operation and other radio network systems with the TETRA network, provided only that the data transmission interfaces of the other radio network systems are compatible with the TETRA network as regards their parts required for the described functionality. The system according to the invention also allows communication between units choosing the same mode of operation but having different rights of communication.

With the system according to the invention such a functionality is achieved in a simple and advantageous manner, which is typical e.g. of the DMO repeater, which can be used to essentially enlarge the coverage area of the actual physical TETRA network and in this way to bring about possibilities for remote communication, for example, with a DMO group carrying out a duty outside the network's coverage area. Management of the gateway unit, which can be performed both at the unit and also over the air, is easy and it can be built up of components and functional parts known as such. No changes are required in the terminal devices at software level, but they are suitable in accordance with existing standards unmodified for implementation of the gateway according to the invention. Other additional advantages, which can be achieved with the system according to the invention, will emerge from the description part and the characteristic features will emerge from the appended claims.

BRIEF DESCRIPTION OF THE DRAWINGS

The system according to the invention, which is not limited to the embodiments presented hereinafter, will be described in greater detail with reference to the appended figures, wherein.

DETAILED DESCRIPTION OF THE INVENTION

Figure 1:
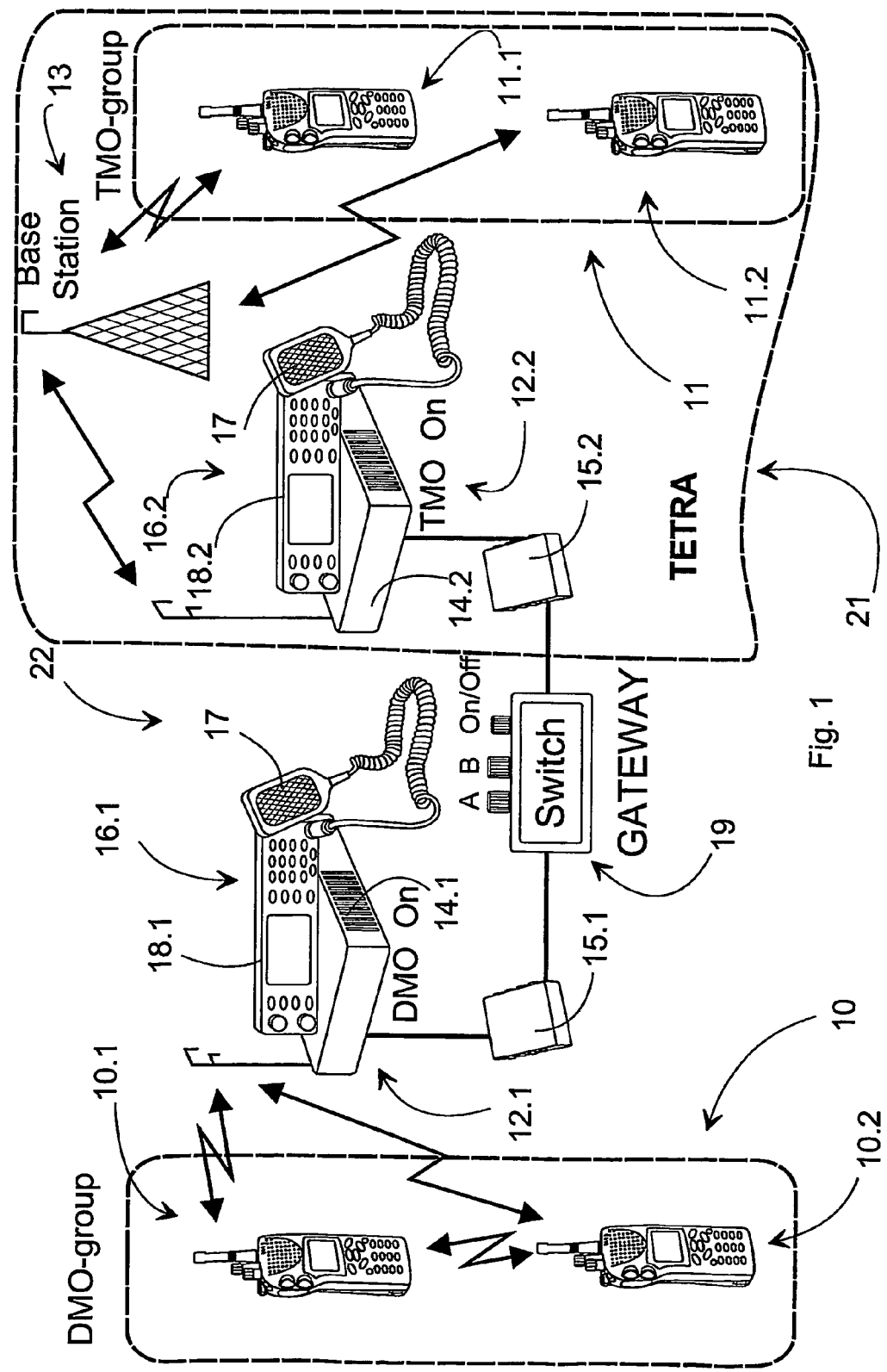
FIG. 1 shows a schematic view of an application example using the system according to the invention.
Figure 2:
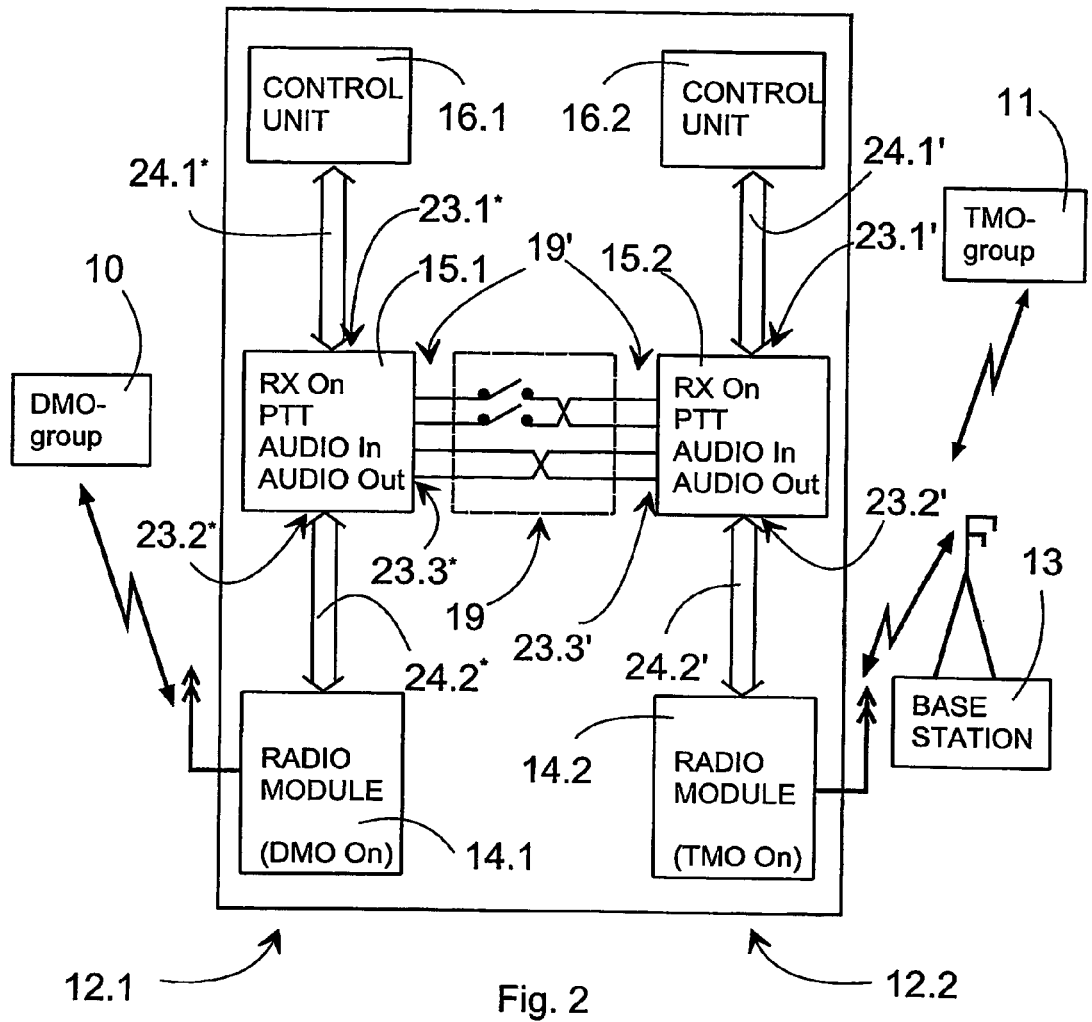
FIG. 2 shows a rough schematic view of the logical parts of a gateway unit according to the invention.

FIGS. 1 and 2 show an assembly implementing the system according to the invention. User units moving in the operational field, such as e.g. police officers (not shown), carry with them a terminal device 10.1, 10.2, 11.1, 11.2 according to the TETRA standard. According e.g. to their location or duties, the units may form groups 10, 11, whereby they have set their terminal devices 10.1, 10.2, 11.1, 11.2 in a suitable mode of operation.

A DMO group 10 have set their terminal devices 10.1, 10.2 in the DMO function and they communicate only within their own group, whereby the units located outside group 10 according to the state of the art are unable to listen to or take part in the communication of group 10. Such situations, where a terminal device 10.1, 10.2 can be set in the DMO function, may occur both within the coverage area of the physical TETRA network 21 and also outside the coverage area, whereby the terminal device's 10.1, 10.2 DMO function is the only mode of operation allowing communication between the units.

The terminal device's 11.1, 11.2 TMO function may be used by units carrying out duties within the coverage area of the actual physical TETRA network 21 and forming TMO groups 11. The physical digital TETRA radio network 21 is determined by the area covered by the base transceiver stations 13. In the TMO function, the TETRA network 21 distributes network resources to the terminal devices 11.1, 11.2 located inside the coverage area as they request them according to their priority level in the communication.

Furthermore, it is of course possible within different modes of operation to divide units into groups, for example, according to their duties or operating areas.

The gateway unit 22 implementing the system according to the invention can be established quickly and easily from two mobile station terminal devices 12.1, 12.2 conventional as such and capable of operating in each desired mode of operation DMO, TMO, provided that they are equipped with an interface for audio and transmission/receiving signals known as such. Both terminal devices 12.1, 12.2 include a control unit 16.1, 16.2 provided with a user interface and including, for example, a display and keyboard part 18.1, 18.2 as well as a microphone part 17 connected to these. Further, the terminal device 12.1, 12.2 includes the transmitter-receiver part (radio module) 14.1, 14.2, which is used to perform transmission and receiving of information. An example of such a terminal device 12.1, 12.2 is the standard Nokia TMR400 radio terminal device. FIG. 2 shows in greater detail the logical implementation of an embodiment of the gateway unit 22 according to the invention. Between the control unit 16.1, 16.2 and the transmitter-receiver part 14.1, 14.2 connection boxes 15.1, 15.2 are connected in both terminal devices 12.1, 12.2 in order to implement the gateway unit 22 according to the invention, such as e.g. MCB405 modified of MCB410. The connection boxes 15.1, 15.2 have three connection interfaces. To the first interface **23.1\*, 23.1' is connected by a cable series 24.1\*, 24.1', such as e.g. TA4092, the terminal device's 12.1, 12.2 control unit 16.1, 16.2. To the second interface 23.2\*, 23.2' is connected by a cable series 24.2\*, 24.2', such as e.g. TA4038, the terminal device's 12.1, 12.2 transmitter-receiver part 14.1, 14.2. The connection of the connection box's 15.1, 15.2 first and second interface 23.1\*, 23.1', 23.2\*, 23.2' is conventional as such and it connects in a known manner the terminal device's 12.1, 12.2 control unit 16.1, 16.2 and transmitter-receiver part 14.1, 14.2. For the connection of the third interface 23.3\*, 23.3' the lines required for implementation of the system according to the invention are taken from the data transfer bus between the terminal device's 12.1, 12.2 control unit 16.1, 16.2 and transmitter-receiver part 14.1, 14.2**.

The lines needed for implementing the gateway unit 22 according to the invention at its minimum, for which a connection is arranged in the third interface **23.3\*, 23.3' of connection box 15.1, 15.2**, are audio input AUDIO In and audio output AUDIO Out as well as the receiving indication output RX On and the transmission connection input PTT (Push to Talk).

To the connection boxes 15.1, 15.2 are connected to the above-mentioned input and output connections **23.3\*, 23.3' by a cable series (for example, TA4114) a switch arrangement 19 connecting terminal devices 12.1, 12.2 crosswise from the said lines, which switch arrangement 19 is based, for example, on MCB400 mechanics. The switch arrangement 19 may include, for example, contact breakers A, B, which are operated manually and which facilitate control of the gateway's 22 transmission state, in order to choose the active data transfer direction, and an On/Off switch to activate and passivate the gateway unit 22 (FIG. 1). The switches A and B for choosing the data transfer direction may be arranged in connection with the RX On—PTT lines 19.1, 19.2**.

Figure 3:
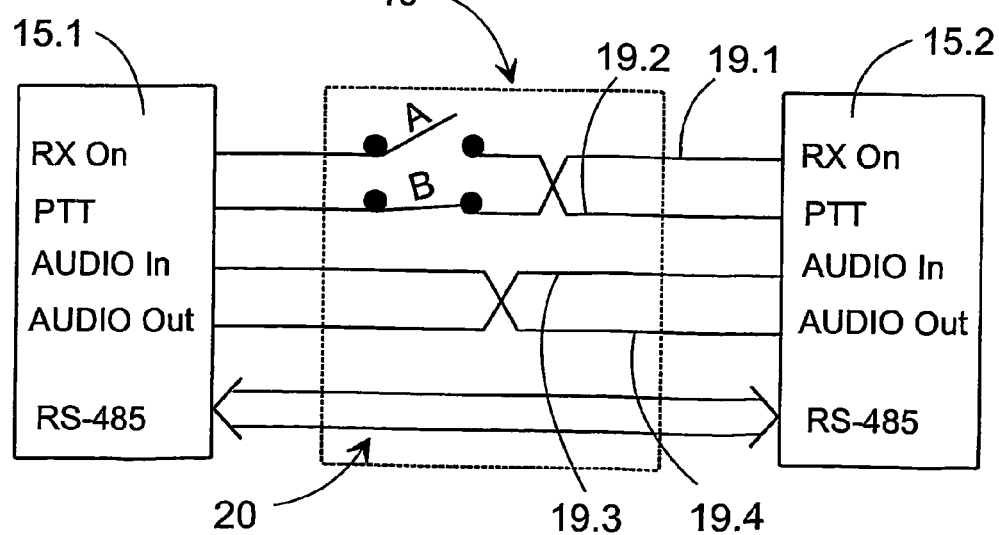
FIG. 3 shows a more advanced embodiment of the gateway unit according to the invention from the data transfer interface.

FIG. 3 shows an application example based on FIG. 2, which includes, besides the said control lines 19.1, 19.2 and the lines 19.3, 19.4 allowing communication in audio form, also a data bus 20, which may e.g. be implemented in series form (RS) (for example, of the RS-485 or the RS-232 type). Data bus 20 can be used to transmit e.g. status or SDS (Short Data Service) messages, which may be, for example, emergency messages, urgent requests, callback requests, message acknowledgements, group settings and other such information characteristic of the TETRA network.

In the following the operation of the system according to the invention will be described referring to FIGS. 1 and 2. It should be noted that FIG. 1 is a schematic presentation of the gateway unit 22, because in this embodiment the connection box 15.1, 15.2 is arranged in between the terminal device's 12.1, 12.2 control unit 16.1, 16.2 and the transmitter-receiver part 14.1, 14.2, as is shown in FIG. 2. Hereby the terminal devices 12.1, 12.2 forming gateway 22 may also be used in ordinary terminal use, without the gateway function according to the invention. Use of terminal device 12.1, 12.2 for an ordinary communication purpose known as such is also possible when the gateway function is active.

In the example, traffic both in the half-duplex and in the duplex form is possible, depending on the settings of terminal devices 12.1, 12.2. FIG. 1 shows an arrangement of communication between a group 10 using the DMO function in its TETRA terminal device 10.1, 10.2 and a group 11 using the TMO function in a corresponding terminal device 11.1, 11.2 within the coverage area of the physical TETRA network 21 with the gateway unit 22 according to the invention.

First the gateway's 22 first terminal device 12.1 is connected from the control unit's 16.1 keyboard part 18.1 to the DMO function (DMO On) and the second terminal device 12.2 is connected from the control unit's 16.2 keyboard part 18.2 to the TMO function (TMO On). The connection may also be performed through the radio network 21 over the air, whereby it may be done e.g. by the dispatcher or by the operation leader (not shown). Then the units located within the coverage area of the TETRA network 21 can from their terminal devices 11.1, 11.2 choose as their TMO group the same as the one with the gateway's 22 TMO terminal device 12.2. For example, the radio terminal devices 10.1, 10.2 located outside the coverage area of the TETRA network 21 are connected to the DMO function, from which they choose the DMO channel for their communication.

If it is desired that the communication of a formed DMO group 10 should be audible in the TMO group 11 and vice versa, then both contact breakers A, B of the switch arrangement 19 are in the On position, whereby both RX On—PTT lines 19.1, 19.2 are switched on. The gateway unit 22 listens to each mode of operation DMO, TMO. If, for example, there is hereby traffic in the DMO group 10, a terminal device 12.1 set in the gateway unit's 22 DMO function will receive the transmission. At the same time, a signal is relayed from the receiving indication output RX On of gateway unit's 22 terminal device 12.1 to the PTT input of gateway unit's 22 receiving terminal device 12.2 connected to the TMO function. At the same time, the terminal device 12.1 connected to the DMO function relays its received message occurring in DMO group 10 from the Audio Out connection to the Audio In connection of terminal device 12.2 using gateway's 22 TMO function, from which the message is transmitted further to the same group 11 located in the physical TETRA network 21 and using the TMO function.

A relaying step of a similar kind takes place with a transmission taking place in TMO group 11, where the receiving indication RX On signal of terminal device 12.2 connected to the TMO function is relayed to the PTT connection of terminal device 12.1 of gateway 22, which is set to the DMO function, whereby the message relayed by audio lines connected crosswise is heard by terminal devices 10.1, 10.2 of the DMO group 10. This allows communication between the TETRA DMO group 10 and the TETRA TMO group 11 in such a way that a transmission taking place in DMO group 10 can be received in TMO group 11, and correspondingly vice versa.

FIG. 3 shows an application example, where transmission of messages is possible in one direction only, whereby only listening to messages is possible in the opposite direction. Hereby contact breaker A, B is used to close only one of the RX On—PTT lines. If, for example, the group 10 using the DMO function in their terminal devices 10.1, 10.2 wishes only to listen to the communication of TMO group 11 located in the TETRA network 21 without their own discussion being audible outside DMO group 10, the contact breaker B of gateway unit 22 is turned to the On position. Hereby when communication occurs in TMO group 11, the receiving indication RX On of terminal device 12.2 of the gateway 21 set in the TMO function will be activated and it will switch into the transmitting state the terminal device 12.1 set in gateway's 22 DMO function, thus activating the PTT line, whereby a message transferring on audio line 19.4 will be transmitted by gateway unit's 22 terminal device 12.1 to the DMO group 10. When the DMO group 10 is communicating, their messages will not be relayed by way of gateway 22 to the terminal devices 11.1, 11.2 of TMO group 11, because switch A is now in the Off position breaking off the line 19.1 between the receiving indication output RX On and the transmission input PTT that allows the communication in concerned direction. A unidirectional functionality of a similar kind is also possible in the other direction of transmission.

The gateway unit according to the invention can also be implemented without the connection box 15.1, 15.2 used in the foregoing application examples. Hereby the said lines 19.1, 19.2, 19.3, 19.4, 20 are connected directly to the transmitter-receiver part 14.1, 14.2 and the transmission state of gateway unit 22 is controlled with the switch arrangement 19. Furthermore, switch arrangement 19, too, may be left but, whereby control of the transmission state is controlled e.g. by way of the user interface of terminal device 12.1, 12.2 using software or with the aid of switches (not;shown) arranged in connection with control unit 16.1, 16.2 or transmitter-receiver part 14.1, 14.2. As one more alternative, in order to control the transmission state of gateway unit 22 there is remote control taking place over the air over radio network 21, where e.g. the operation leader or the dispatcher can activate or passivate the transmission state of gateway unit 22 according to the current need at each time.

With the system according to the invention it is also possible to achieve functionality of the DMO repeater type, whereby it is possible to connect, for example, two groups using the DMO function and located outside or inside the coverage area of the TETRA network 21. This is especially practical in shadow regions of network 21 and in rescue operation situations.

Since all controls and control signals of terminal device 12.1, 12.2 exist as such, there is no need for any changes either at the equipment level or at the software level in order to implement the system according to the invention.

With the system according to the invention it is possible to connect not only the case described above, where connection was established between a DMO group 10 located outside the coverage area of the TETRA network 21 and a TMO group 11 located within the TETRA network 21, but also other mode of operation combinations of the TETRA network 21. Such are, for example, TMO-TMO, TMO-DMO, DMO-DMO. Different receiving and transmission rights may be given to the units in the TETRA network 21 even in the same modes of operation, whereby communicative connecting of the units with different rights may be easily performed with the gateway unit 22 making possible the system according to the invention, because the operation leader may grant over the air to terminal devices 12.1, 12.2 the necessary group rights for transmission of messages. The operation leader may also change e.g. the group settings of DMO group 10 through gateway unit 22. Hereby the said settings are relayed to the terminal device 12.1 using the DMO function through data bus 20, possibly for relaying to group 10.

With the gateway unit 22 according to the invention it is also possible to perform transmission of traffic between terminal devices 10.1, 10.2, 11.1, 11.2 according to the TETRA standard and terminal devices of some other radio system (not shown). It is hereby an essential precondition for the transmission operation that from the data transfer interfaces of these systems if find the same said connections, which form the minimum precondition for implementation of the system according to the invention.

In the following some typical exemplifying situations are listed, where the functionality implementing the system according to the invention brings significant advantages. The police are carrying out an operation in a parking hall, where the concrete walls reduce the TMO receiving area. A police vehicle equipped with a gateway according to the invention is driven to a place having TMO coverage. The police operating in the parking hall can now use the DMO and can be in connection with the leader of the operation, who uses TMO.

Rescue workers are outside TMO coverage when looking for a disappeared child. They use the DMO function in their internal communication. A car, where a gateway according to the invention is placed, is driven e.g. on top of a hill located within the TMO coverage area. Through the gateway the leader of the rescue operation can now from headquarters be in speech connection with the rescuing persons, even if he would be far away from the actual place of disappearance.

The police are doing traffic control at a large public event and in their communication they use their terminal devices' DMO function within the TETRA network's coverage area. Through the gateway according to the invention the dispatcher or the police commander can establish connection with them through the TETRA network when required.

It should be understood that the above explanation and the figures relating thereto are intended only to illustrate the present system according to the invention. Thus, the invention is not limited only to the embodiments presented above or to those determined in the claims, but many such different variations and modifications of the invention will be obvious to the man skilled in the art, which are possible within the scope of the inventive idea defined by the appended claims.

The inventioned claimed is:

1. System for transmitting information in a digital radio network system (21) between at least two modes of operation, which may be a direct mode operation (DMO) between two terminal devices (10.1, 10.2) operating independently of the physical radio network system (21), and a trunked mode operation (TMO) supporting distribution of network resources and operating in the physical radio network system (21), and wherein the transmission takes place with the aid of a special gateway unit (22), wherein the gateway unit (22)

listens to each or to a chosen mode of operation (DMO, TMO), receives the transmission occurring in one mode of operation (TMO, DMO), and transmits the received transmission to the other mode of operation (DMO, TMO), characterized in that the gateway unit (22) is formed of two terminal devices (12.1, 12.2) supporting each mode of operation and whose data transfer interface (23.3*, 23.3') have an audio input (AUDIO In) and output (AUDIO Out) as well as a receiving indication output (RX On) and a transmission connection input (PTT), and the terminal devices' (12.1, 12.2) receiving indication output (RX On) is connected to the transmission connection input (PTT) of another terminal device (12.2, 12.1) and the terminal devices' (12.1, 12.2) audio output (AUDIO Out) is connected to the audio input (AUDIO In) of another terminal device (12.2, 12.1).

2. System according to claim 1, characterized in that the terminal devices' (12.1, 12.2) data transfer interface (23.3*, 23.3') also includes a bus (20) for transmission of data.

3. System according to claim 2, characterized in that the said bus (20) is in serial traffic form (RS), such as, for example, RS-485 or RS-232.

4. System according to claim 2, characterized in that the bus (20) is used for transferring e.g. status or SDS (Short Data Service) messages or group settings.

5. System according to claim 1, characterized in that in the gateway unit (22) in connection with the data transfer interface (23.3*, 23.3') there are switch means (19) for controlling the transmission state.

6. System according to claim 1, characterized in that the transmission state of the gateway unit (22) is controlled with the terminal device's (12.1, 12.2) control unit (16.1, 16.2).

7. System according to claim 1, characterized in that the transmission state of the gateway unit (22) is controlled through the radio network (21) over the air.

8. System according to claim 1, characterized in that the said digital radio network is, for example, a TETRA network (21) (TErresrial Trunked RAdio).

* * * * *